US006970337B2

(12) United States Patent
Strahm

(10) Patent No.: US 6,970,337 B2
(45) Date of Patent: Nov. 29, 2005

(54) HIGH-VOLTAGE LOW-DISTORTION INPUT PROTECTION CURRENT LIMITER

(75) Inventor: Chris N. Strahm, Portland, OR (US)

(73) Assignee: Linear X Systems Inc., Tualatin, OR (US)

( * ) Notice: Subject to any disclaimer, the term of this patent is extended or adjusted under 35 U.S.C. 154(b) by 211 days.

(21) Appl. No.: 10/603,400

(22) Filed: Jun. 24, 2003

(65) Prior Publication Data

US 2004/0264090 A1 Dec. 30, 2004

(51) Int. Cl.[7] .............................................. H02H 9/00
(52) U.S. Cl. ...................................................... 361/58
(58) Field of Search ........................... 361/58, 18, 91.1

(56) References Cited

U.S. PATENT DOCUMENTS

| | | | | |
|---|---|---|---|---|
| 3,603,811 | A * | 9/1971 | Day et al. | 327/328 |
| 4,405,964 | A | 9/1983 | Woods et al. | |
| 4,533,970 | A | 8/1985 | Brown | |
| 4,744,369 | A | 5/1988 | Kroll | |
| 4,868,703 | A | 9/1989 | Yoshioka | |
| 4,891,728 | A | 1/1990 | Preis et al. | |
| 5,196,980 | A | 3/1993 | Carson | |
| 5,235,201 | A | 8/1993 | Honna | |
| 5,272,392 | A | 12/1993 | Wong et al. | |
| 5,383,082 | A | 1/1995 | Nishizawa | |
| 5,422,593 | A | 6/1995 | Fujihira | |
| 5,517,379 | A | 5/1996 | Williams et al. | |
| 5,559,658 | A | 9/1996 | Cooper et al. | |
| 5,585,991 | A | 12/1996 | Williams | |
| 5,684,663 | A | 11/1997 | Mitter | |
| 5,729,418 | A * | 3/1998 | Lei | 361/58 |
| 5,734,261 | A | 3/1998 | Knudsen | |
| 5,742,463 | A | 4/1998 | Harris | |
| 5,781,390 | A | 7/1998 | Notaro et al. | |
| 5,815,356 | A | 9/1998 | Rodriguez et al. | |
| 6,046,476 | A | 4/2000 | Morishita et al. | |
| 6,163,712 | A | 12/2000 | Winkler et al. | |
| 6,507,471 | B2 | 1/2003 | Colclaser et al. | |
| 6,518,799 | B2 | 2/2003 | Yoshida | |
| 6,529,355 | B1 | 3/2003 | Becker et al. | |
| 6,714,393 | B2 * | 3/2004 | Nostrand | 361/58 |
| 2001/0053054 | A1 | 12/2001 | Andoh | |
| 2002/0071230 | A1 | 6/2002 | Colclasser et al. | |
| 2002/0075617 | A1 | 6/2002 | Ponton et al. | |
| 2002/0159212 | A1 | 10/2002 | Oughton, Jr. | |
| 2003/0038658 | A1 | 2/2003 | Theogarajan | |

(Continued)

OTHER PUBLICATIONS

LND1 Series Application Note AN-D11, ±500 Volt Protection Circuit, Supertex Inc., www.supertex.com, Aug. 14, 2000.

*Primary Examiner*—Ronald Leja
(74) *Attorney, Agent, or Firm*—Joseph P. Curtin, L.L.C.

(57) ABSTRACT

A floating symmetrical current limiter device blocks large bipolar input signals to the input circuit of an instrumentation device by transitioning between a low-impedance mode and a high-impedance mode. The current limiter device includes a signal path and a control path that are each coupled between an input terminal and an output terminal. The signal path has a low impedance that passes small differential signals across the limiter from the input terminal to the output terminal. The control path is responsive to large bipolar signals that appear across the limiter terminals by transitioning between a voltage divider and a constant-current source-based bias that controls the impedance of the signal path to become a large impedance, thereby blocking the large bipolar input signal from the output terminal.

19 Claims, 13 Drawing Sheets

400

U.S. PATENT DOCUMENTS

2003/0052368 A1 3/2003 Tsuji et al.
2003/0076643 A1 4/2003 Chu et al.
2003/0086221 A1 5/2003 Chu et al.
2003/0090855 A1 5/2003 Chu et al.

* cited by examiner

HIGH-VOLTAGE LOW-DISTORTION INPUT PROTECTION CURRENT LIMITER

BACKGROUND OF THE INVENTION

1. Field of the Invention

The present invention relates to a current limiter circuit for protecting input circuits. More particularly, the present invention relates to a current limiter circuit for protecting input circuits from excessive over-voltage conditions and excessive input currents, while providing low distortion for small-signal input voltages.

2. Description of the Related Art

Input circuits appear in a wide variety of applications, including instrumentation devices such as Digital Multimeters (DMMs), oscilloscopes, spectrum analyzers and general purpose data acquisition equipment. Typically, input protection is required for preventing input circuits from destruction caused by over-voltage conditions.

In many cases, a simple arrangement of diode clamps are utilized for limiting the input voltage to the internal power supplies of the circuit. Such an arrangement, however, creates a condition in which excessive current may be injected externally through the clamp diodes.

FIG. 1 shows a schematic block diagram of a typical input circuit 100 having a conventional current limiter 101 for limiting excessive current. Input circuit 100 includes an input resistor R1, a current limiter device 101, two clamp diodes D1 and D2, and an amplifier A1. An input signal input at IN is applied to resistor R1. The input signal is coupled through current limiter device 101 to the input of amplifier A1. Current limiter device 101 is depicted in FIG. 1 as a resistor. The anode of clamp diode D1 is coupled to the input of amplifier A1. The cathode of clamp diode D1 is coupled to supply voltage $V_{CC}$. The cathode of clamp diode D2 is coupled to the input of amplifier A1. The anode of clamp diode D2 is coupled to supply voltage $V_{EE}$. Clamp diodes D1 and D2 limit the input voltage that can be applied to the input to amplifier A1 to about supply voltages $V_{CC}$ and $V_{EE}$. Current input device 101 limits that amount of current that can be supplied externally to clamp diodes D1 and D2 and to the input of amplifier A1 when the externally applied input voltage exceeds the clamping voltages of $V_{CC}$ and $V_{EE}$.

FIGS. 2A–2C depict circuit components that are conventionally used as current limiting devices. For example, FIG. 2A depicts a resistor 201. FIG. 2B depicts a Positive Temperature Coefficient (PTC) thermistor 202. FIG. 2C depicts a light bulb 203.

Another example of a conventional input protection circuit is disclosed by U.S. Pat. No. 5,742,463 to Harris. According to Harris, such an input protection circuit includes at least two depletion-mode field effect transistors, and can provide unipolar or bipolar operation, thereby protecting an input circuit from both positive-going and negative-going voltage transients.

The goals of an ideal current limiter include the capability to prevent destruction of input components, including the limiter itself. Input current for such an ideal current limiter should be limited based on the maximum expected input voltage. The ideal current limiter should also provide a low-noise, highly-linear, low-value impedance for normal, small-voltage operating conditions, while providing a high impedance for large voltages. Thus, the impedance state of an ideal current limiter must change based on the applied voltage. Additionally, both the inrush transient current and static power dissipation of an ideal current limiter should be minimized for preventing failure of any components.

What is needed is yet a better technique for limiting overload current for preventing destruction of clamp diodes and input circuitry.

BRIEF SUMMARY OF THE INVENTION

The present invention provides a current limiter circuit for limiting overload current and thereby preventing destruction of the input components of an input circuit, including the current limiter circuit itself The current limiter of the present invention is characterized by three regions of operation and provides a low-noise, highly-linear, low-value input impedance for normal, small-voltage operating conditions, while providing a protective high impedance for large voltages. The current limiter circuit is symmetrical and floats on the input signal without connection to ground or power supplies. Further, the inrush transient current and the static power dissipation of a current limiter according to the present invention are minimized.

The advantages of the present invention are provided by a current limiter device that has a signal path and a control path that are both coupled between an input terminal and an output terminal. The output terminal can be coupled to an input circuit of, for example, an instrumentation device, a digital multimeter, an oscilloscope, a spectrum analyzer or a general-purpose data-acquisition device. According to the invention, the signal path of the current limiter device has a low impedance that passes small differential signals from the input terminal to the output terminal for voltages that are typically less than about one volt across the limiter. The control path is responsive to larger bipolar signals applied across the limiter by outputting a substantially constant current that is considerably less than what would be present in the low impedance path. The substantially constant current controls the impedance of the signal path to be a large impedance, thereby blocking the large bipolar input signal from the output terminal.

An alternative embodiment of the present invention provides a current limiter circuit having a signal path and a control path that are each coupled between an input terminal and an output terminal. The output terminal can be coupled to an input circuit of, for example, an instrumentation device, a digital multimeter, an oscilloscope, a spectrum analyzer or a general-purpose data-acquisition device. The signal path includes at least one depletion-mode device, such as an N-channel depletion-mode MOSFET, and a variable-impedance device, such as a P-Channel JFET, and passes small differential signals from the input terminal to the output terminal for differential signals that are typically less than one volt. Additionally, the signal path has a low impedance for these small differential signals across the limiter. The control path includes at least one depletion-mode device, such as an N-channel depletion-mode MOSFET and outputs at least one substantially constant current in response to larger bipolar input signals applied across the limiter. Each substantially constant current is considerably less than would be present in the low impedance path and controls at least one depletion-mode device of the signal path to be a high-impedance device and the variable-impedance device to be a high-impedance device so that the large bipolar input signal is blocked from the output terminal.

Yet another alternative embodiment of the present invention provides a current limiter device having a first terminal, a second terminal, and a current limiter circuit that is coupled between the first terminal and the second terminal.

The current limiter circuit has a substantially constant-resistance operating mode when the magnitude of a voltage differential between a voltage at the first terminal and a voltage at the second terminal is less than or equal to a first predetermined voltage differential. The current limiter circuit also has a substantially constant-current operating mode when the magnitude of the voltage differential between the voltage at the first terminal and the voltage at the second terminal is greater than or equal to a second predetermined voltage differential. Lastly, the current limiter circuit has a transition operating mode when the magnitude of the voltage differential between the voltage at the first terminal and the voltage at the second terminal is between the first and second predetermined voltage differentials.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a current limiting circuit that protects input circuits from excessive current. One exemplary embodiment of a current limiting circuit of the present invention provides a bipolar floating limiter having four depletion-mode N-channel MOSFET transistors. The bipolar floating limiter is characterized by three regions of operation and provides a linear low-impedance input for normal-level small signals and a constant current source for overload signals. The four depletion mode N-channel MOSFET transistors provide high voltage overload capability. A single P-Channel JFET provides foldback current limiting during overload conditions, thereby providing low power dissipation. Four resistors are used for configuring the limiter characteristics. Under normal small-signal operation, the current limiter circuit of the present invention is inherently linear because only resistors and FETs are used.

Figure 1:
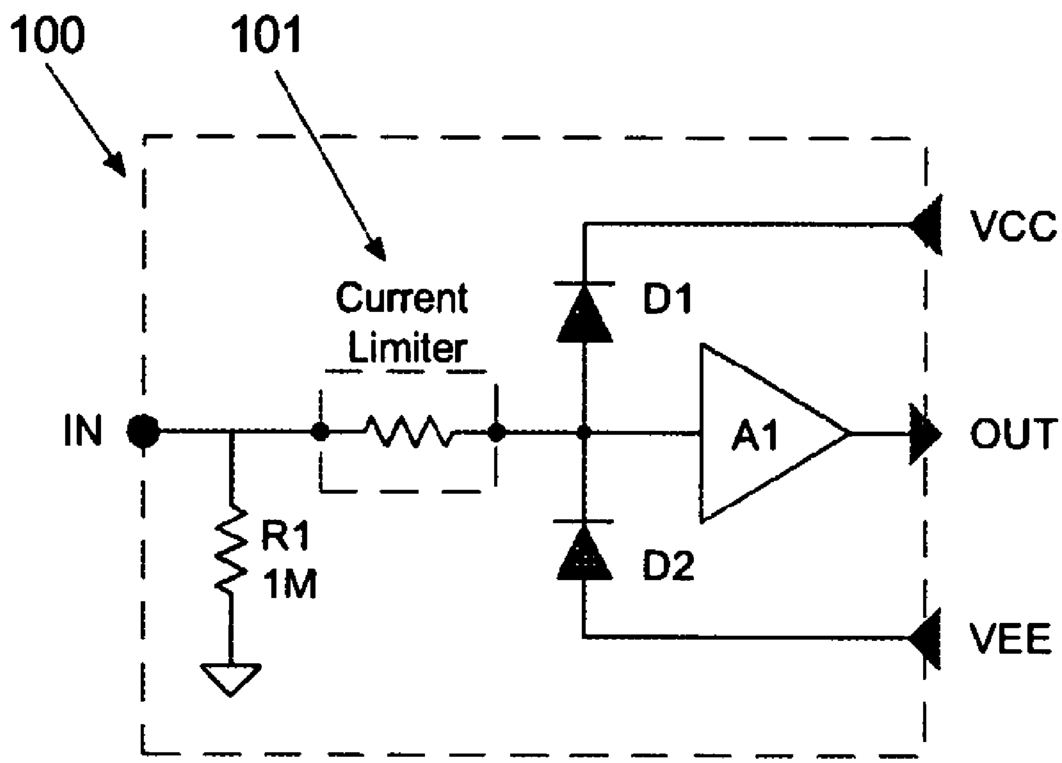
FIG. 1 shows a schematic block diagram of a typical input circuit having a conventional current limiter.
Figure 2A:
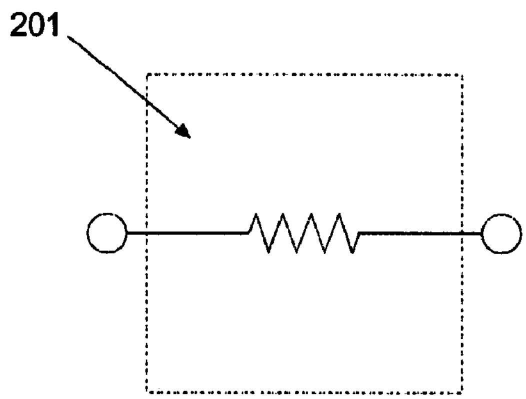
FIGS. 2A–2C depict circuit components that are conventionally used as current limiting devices.
Figure 2B:
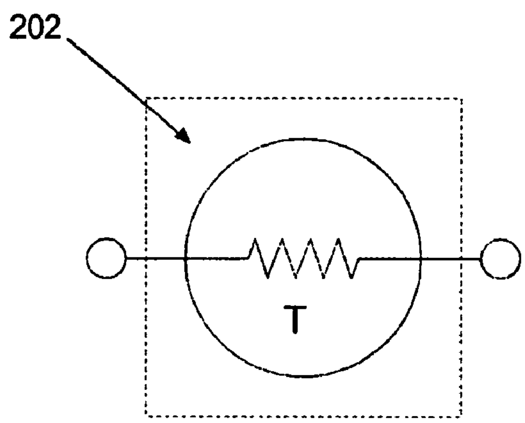
Figure 2C:
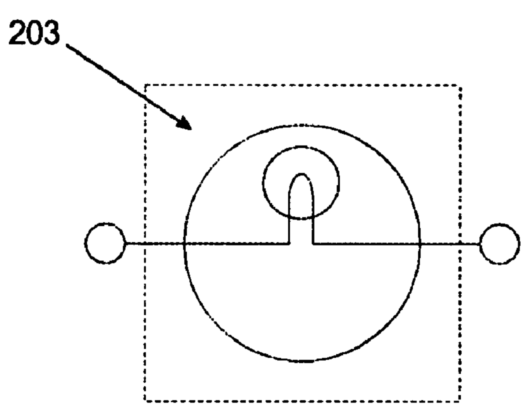
Figure 3:
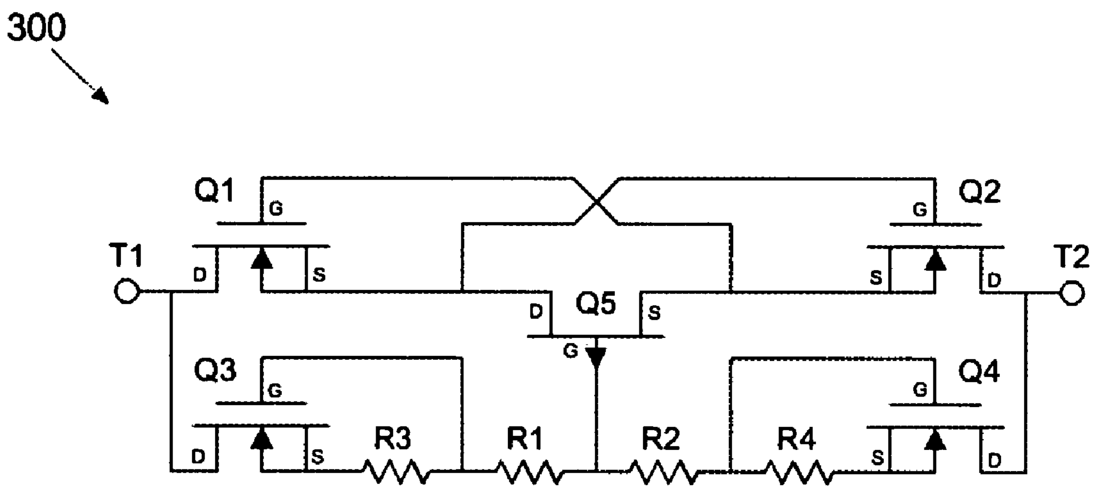
FIG. 3 shows a schematic diagram of an exemplary embodiment of a current limiter circuit according to the present invention.

FIG. 3 shows a schematic diagram of an exemplary embodiment of a current limiter circuit 300 according to the present invention. Current limiter circuit 300 includes four depletion-mode N-channel MOSFET transistors Q1–Q4, a P-channel JFET transistor Q5 and four resistors R1–R4, which together form two circuit paths. The first circuit path is formed by input terminal T1 being coupled to the drain of transistor Q1. The substrate of transistor Q1 is connected to the source of transistor Q1, and the source of transistor Q1 is coupled to the drain of transistor Q5. The gate of transistor Q1 is coupled to the source of transistor Q5, and to the source and substrate of transistor Q2. The gate of transistor Q2 is coupled to the drain of Q5, and to the source and substrate of transistor Q1. The drain of transistor Q2 is coupled to output terminal T2. Output terminal T2 is typically coupled to an input circuit of an instrumentation device, such as a Digital Multimeter (DMM), an oscilloscope, a spectrum analyzer or a general-purpose data-acquisition equipment.

The second circuit path, a control path, is formed by input terminal T1 being coupled to the drain of transistor Q3. The substrate of transistor Q3 is connected to the source of transistor Q3 and to one terminal of resistor R3. The gate of transistor Q3 is coupled to the other terminal of resistor R3 and to one terminal of resistor R1. The other terminal of resistor R1 is coupled to the gate of transistor Q5 and to one terminal of resistor R2. The other terminal of resistor R2 is coupled to the gate of transistor Q4 and to one terminal of resistor R4. The other terminal of resistor R4 is coupled to the source and the substrate of transistor Q4. The drain of transistor Q4 is coupled to output terminal T2.

Figure 4A:
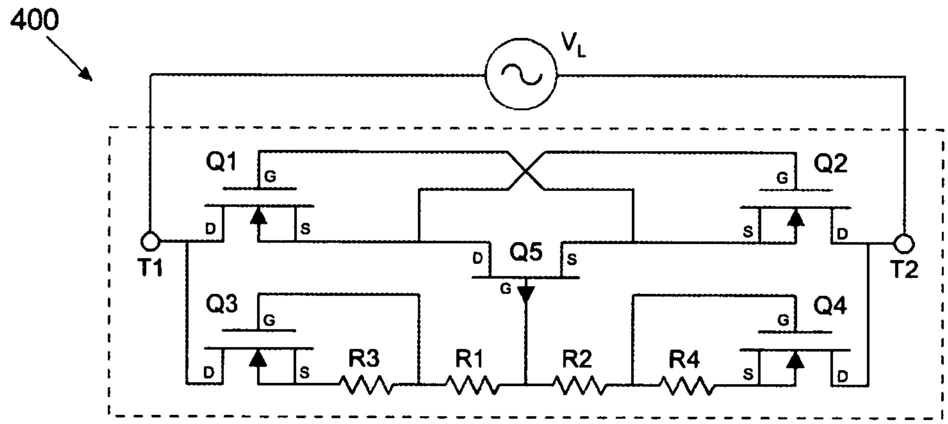
FIGS. 4A–4D show equivalent circuit models for illustrating operation of the current limiter circuit shown in FIG. 3 for small bipolar normal signals.
Figure 4B:
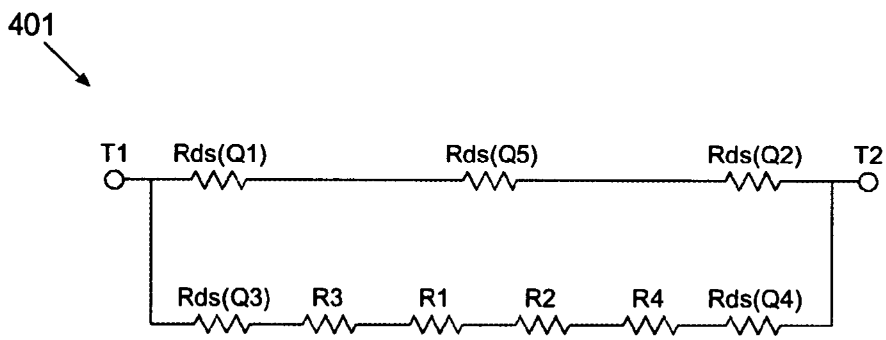
Figure 4C:
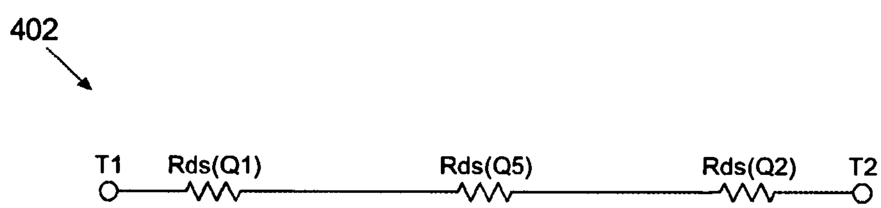
Figure 4D:
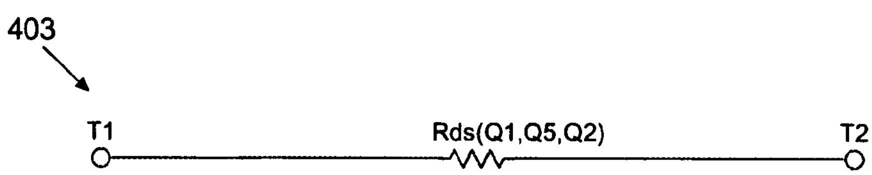

Current limiter circuit 300 provides current limiting in a floating symmetrical bipolar fashion. Consequently, small signal operation of current limiter circuit 300 can be described by reference to the equivalent circuit models shown in FIGS. 4A–4D. FIG. 4A shows a schematic diagram for current limiter circuit 400 for small bipolar limiter voltage $V_L$ conditions, such that $|V_L|<<1$ V. Under normal small-signal conditions, there is insufficient voltage between terminals T1 and T2 for producing the VgsOff voltage of transistors Q3 and Q4. As such, resistors R1–R4 hold the gate of transistor Q5 near the mid-voltage of the terminal potentials, and the $R_{ds}$ value of transistor Q5 is simply its full conduction $R_{ds}$ value. Under normal small-signal condition between terminals T1 and T2, the $R_{ds}$ of transistors Q1 and Q2 are also at full conduction. FIG. 4B shows a schematic diagram for an equivalent circuit model 401 showing that for $|V_L|<<1$ V, all circuit components can be represented by resistances. Resistance values for resistors R1–R4 are each typically greater than 10 kΩ, while the $R_{ds}$ values for each transistor is typically less than 100 Ω. Thus, the normal-state resistance between terminals T1 and T2 for $|V_L|<<1$ V is approximately $R_{ds}$(Q1)+$R_{ds}$(Q5)+$R_{ds}$(Q2), as represented by equivalent circuit 402 in FIG. 4C. Accordingly, a simple equivalent resistance of $R_{ds}$(Q1, Q5, Q2) is shown by equivalent circuit 403 in FIG. 4D.

Figure 5A:
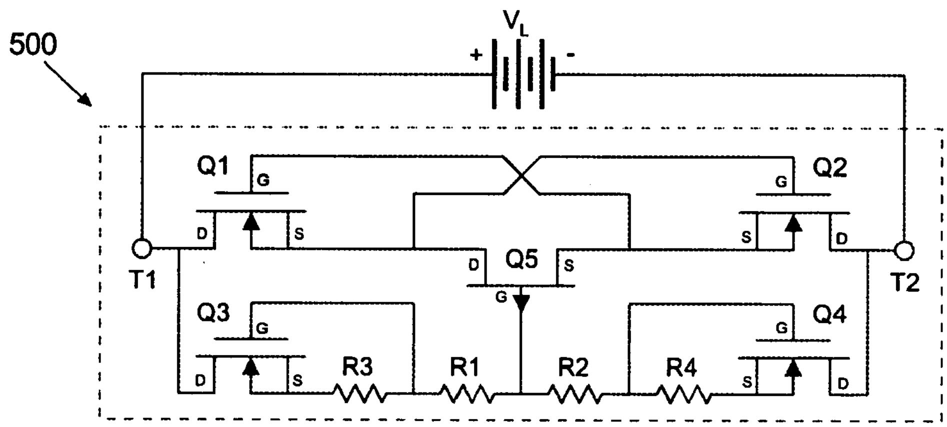
FIGS. 5A–5F show equivalent circuit models for illustrating operation of the current limiter circuit shown in FIG. 3 for large positive overload signals.
Figure 5B:
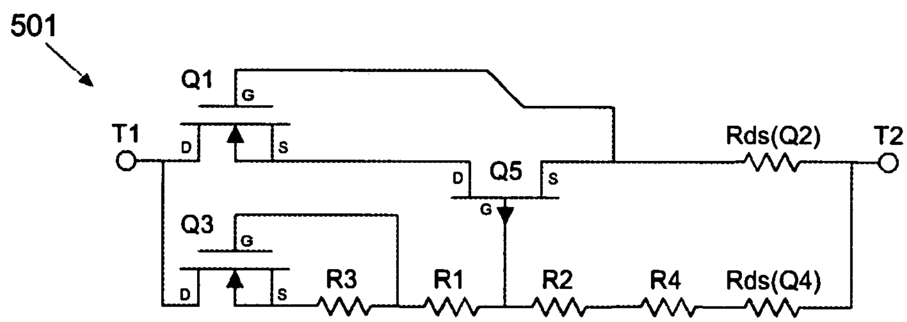
Figure 5C:
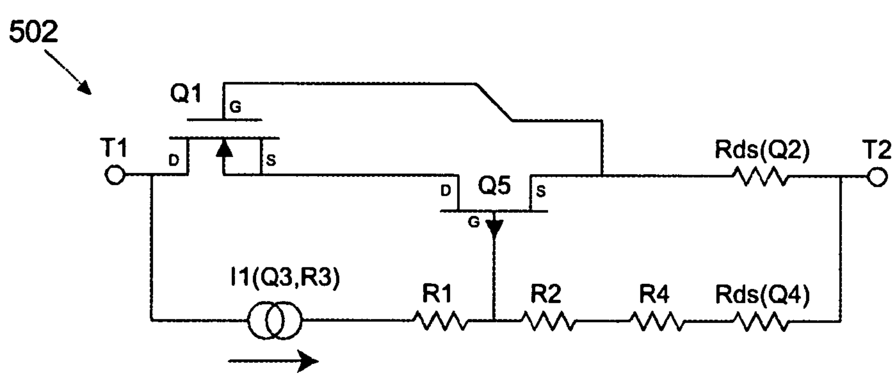
Figure 5D:
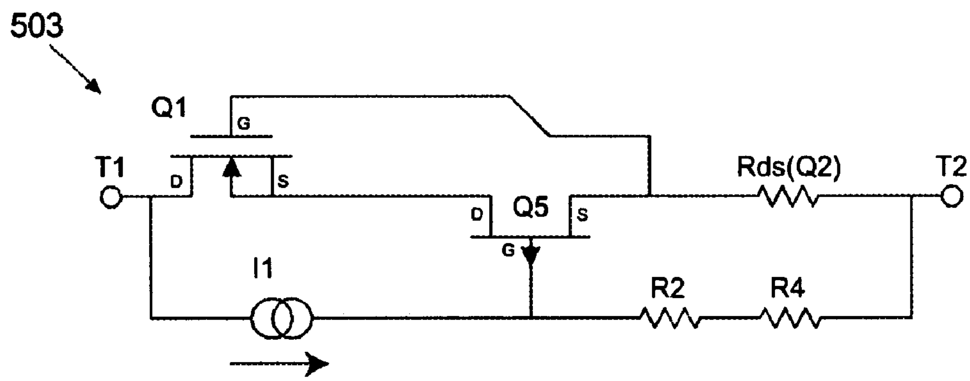
Figure 5E:
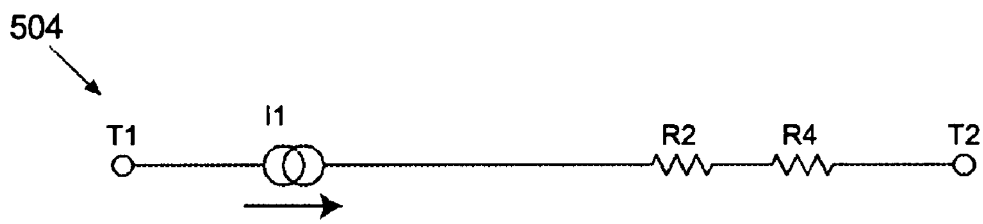
Figure 5F:
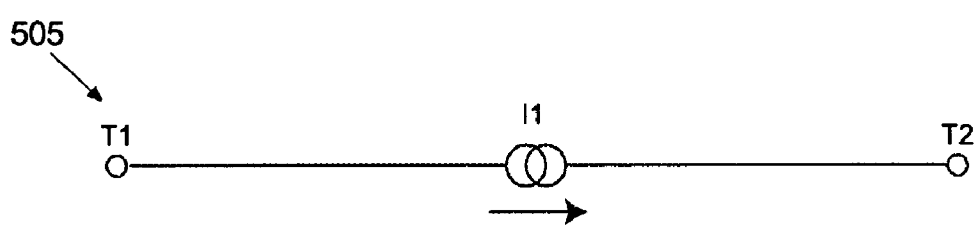

Assume now that input terminals T1 and T2 are connected to a large positive overvoltage. FIG. 5A shows a schematic diagram for current limiter circuit 500 for large positive limiter voltage $V_L$ conditions, such that $V_L$>>+1 V. Because transistors Q2 and Q4 are of the depletion-mode MOSFET type, transistors Q2 and Q4 are in their full ON state, thereby having a low resistance between their drain and source terminals. Consequently, transistors Q2 and Q4 can be replaced by equivalent low-value $R_{ds}$ resistors. FIG. 5B shows a schematic diagram for an equivalent circuit 501 having transistors Q2 and Q4 replaced by low-value $R_{ds}$ resistors. Transistor Q3 and resistor R3 form a current source I1 that outputs a current determined by the VgsOff voltage of Q3 and R3. FIG. 5C shows a schematic diagram for an equivalent circuit 502 having transistor Q3 and resistor R3 replaced by source I1. Resistor R1 is in series with current source I1 and, therefore, can be eliminated from the equivalent circuit. $R_{ds}$ of transistor Q4 can be approximated by a wire because resistors R2 and R4 are each greater than 10 kΩ and $R_{ds}$ of transistor Q4 is <100 Ω. A bias voltage for the gate of Q5 is then developed across R2+R4 in conjunction with the current source I1, as shown by equivalent circuit 503 in FIG. 5D. Transistor Q1 forms a current source that outputs a current that is determined by its VgsOff voltage and the $R_{ds}$ resistance of transistor Q5. The $R_{ds}$ resistance value of transistor Q5 is then defined by its gate voltage which is approximately I1*(R2+R4). This voltage is designed to be greater than the VgsOff voltage of Q5, and therefore turns off transistor Q5 and along with it the current flow through transistor Q1, as shown by equivalent circuit 504 in FIG. 5E. Resistors R2 and R4 are in series with current source I1 and, therefore, can be eliminated. Thus, the only active current path between terminals T1 and T2 is the current source I1 for large positive limiter voltage $V_L$ conditions, as shown by equivalent circuit 505 in FIG. 5F.

Figure 6A:
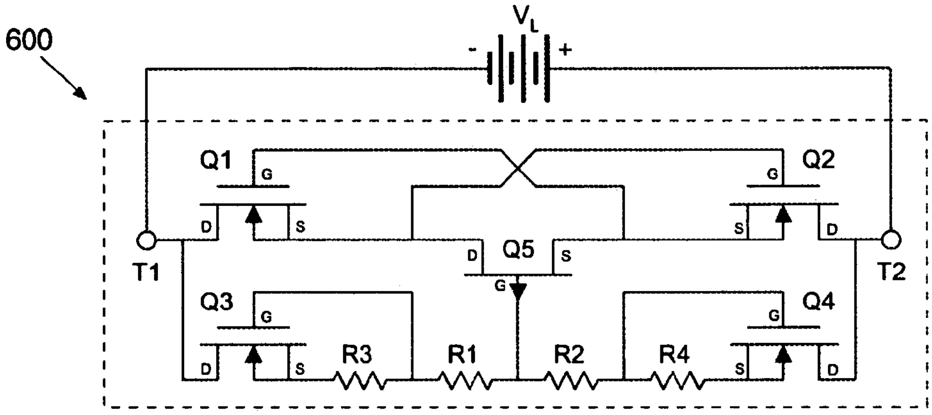
FIGS. 6A–6F show equivalent circuit models for illustrating operation of the current limiter circuit shown in FIG. 3 for large negative overload signals.
Figure 6B:
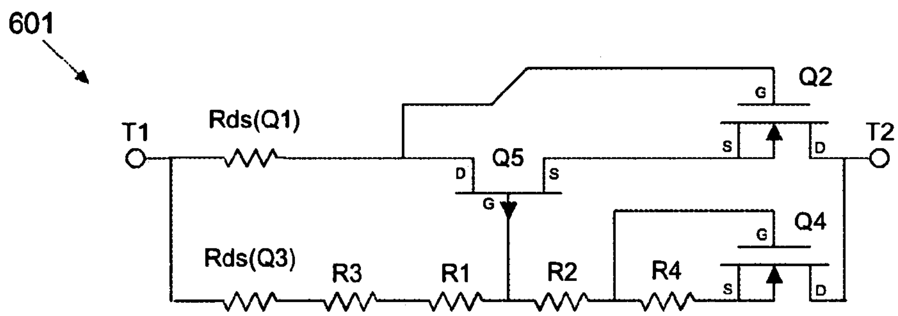
Figure 6C:
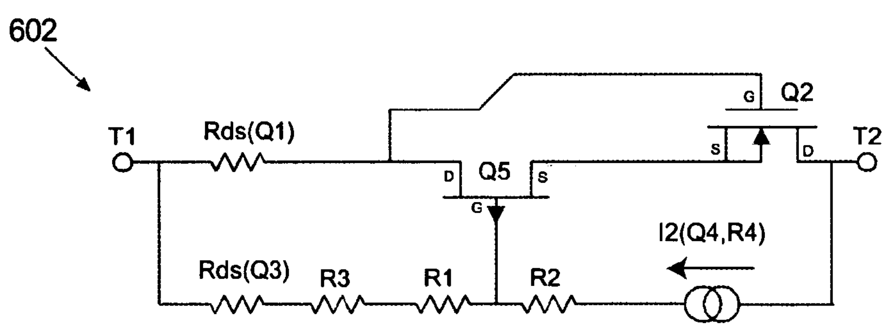
Figure 6D:
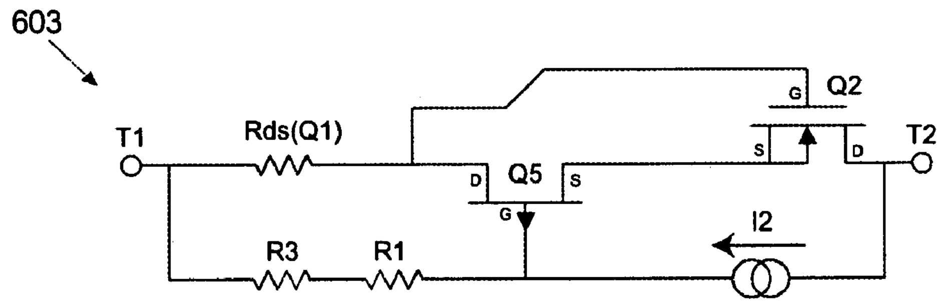
Figure 6E:
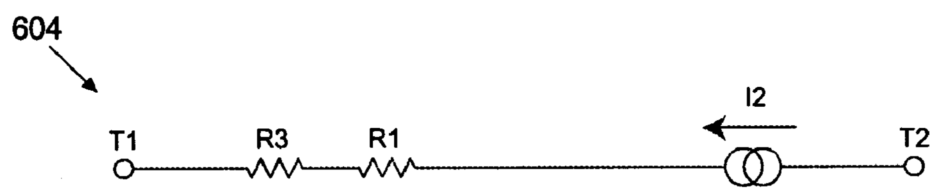
Figure 6F:
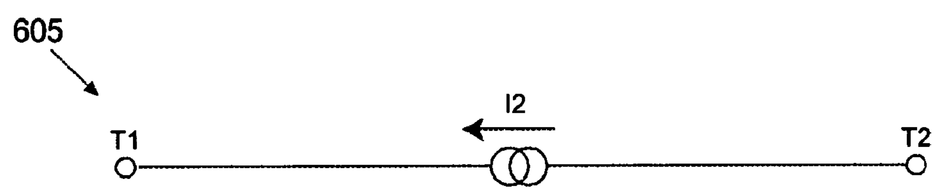

The opposite overload condition of a large negative voltage is shown in the equivalent models of FIGS. 6A–6F. Operation proceeds as similarly described for the positive overload case, but with the actions of the symmetrical devices reversed. Specifically, FIG. 6A shows a schematic diagram for current limiter circuit 600 for large negative limiter voltage $V_L$ conditions, such that $V_L$<<−1 V. Because transistors Q1 and Q3 are of the depletion-mode MOSFET type, transistors Q1 and Q3 are in their full ON state, thereby having a low resistance between their drain and source terminals. Consequently, transistors Q1 and Q3 can be replaced by equivalent low-value $R_{ds}$ resistors. FIG. 6B shows a schematic diagram for an equivalent circuit 601 having transistors Q1 and Q3 replaced by low-value $R_{ds}$ resistors. Transistor Q4 and resistor R4 form a current source I2 that outputs a current determined by the VgsOff voltage of Q4 and R4. FIG. 6C shows a schematic diagram for an equivalent circuit 602 having transistor Q4 and resistor R4 replaced by source I2. Resistor R2 is in series with current source I2 and, therefore, can be eliminated from the equivalent circuit. $R_{ds}$ of transistor Q3 can be approximated by a wire because resistors R1 and R3 are each greater than 10 kΩ and $R_{ds}$ of transistor Q3 is <100 Ω. A bias voltage for the gate of Q5 is then developed across R1+R3 in conjunction with the current source I2, as shown by equivalent circuit 603 in FIG. 6D. Transistor Q2 forms a current source that outputs a current that is determined by its VgsOff voltage and the $R_{ds}$ resistance of transistor Q5. The $R_{ds}$ resistance value of transistor Q5 is then defined by its gate voltage which is approximately I2*(R1+R3). This voltage is designed to be greater than the VgsOff voltage of transistor Q5, and therefore turns off transistor Q5 and along with it the current flow through transistor Q2, as shown by equivalent circuit 604 in FIG. 6E. Resistors R1 and R3 are in series with current source I2 and, therefore, can be eliminated. Thus, the only active current path between terminals T1 and T2 is the current source I2 for large negative limiter voltage $V_L$ conditions, as shown by equivalent circuit 605 in FIG. 6F.

Transistors Q1–Q4 are high voltage N-channel depletion-mode MOSFETs. Transistors Q1–Q4 provide blocking capability of many hundreds of volts, and can easily be cascaded for blocking thousands of volts. Transistor Q5 is a low-voltage P-channel JFET that operates as a variable resistor. Because the VgsOff of transistor Q5 may be greater than the VgsOff of transistors Q3 and Q4, resistors R1 and R2 are needed for producing the required gate voltage for transistor Q5. The values of resistors R1–R4 are selected for controlling the operating characteristics of current limiter circuit 300.

Figure 7:
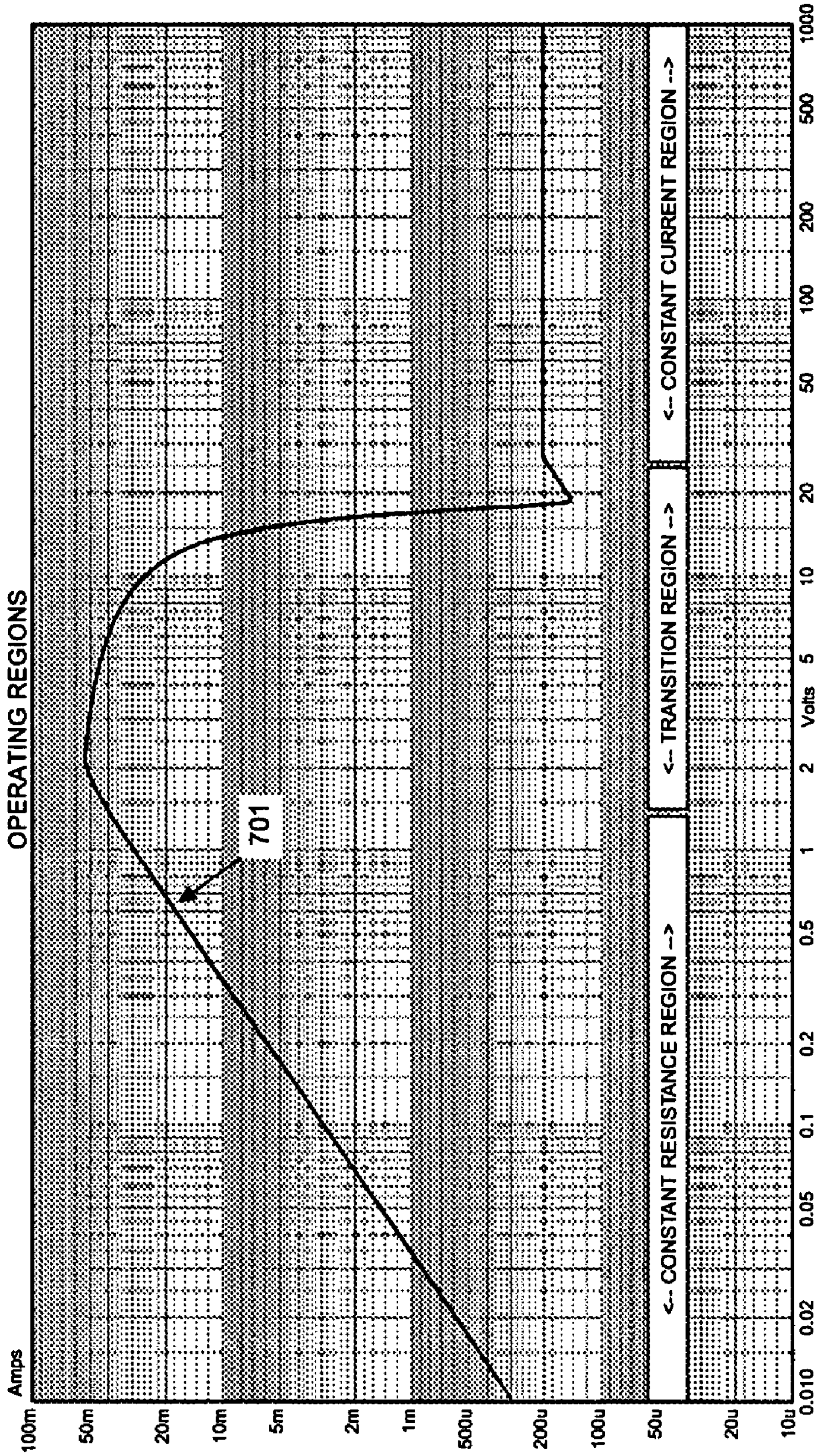
FIG. 7 shows an exemplary graph illustrating the three operating regions of the current limiter circuit shown in FIG. 3.

FIG. 7 shows an exemplary graph illustrating the three operating regions of current limiter circuit 300. The first operating region is a constant resistance region in which current limiter circuit 300 can be characterized by a constant resistance. When operating in the constant resistance region, current through current limiter circuit 300 increases proportionally with increasing voltage in the same manner as a constant resistance. The second operating region is a transition region in which the operating characteristics of current limiter circuit 300 transitions from a constant resistance region to a constant current region. The third operating region is a constant current region in which current through current limiter circuit 300 remains substantially constant for increasing voltage across the limiter.

Figure 8:
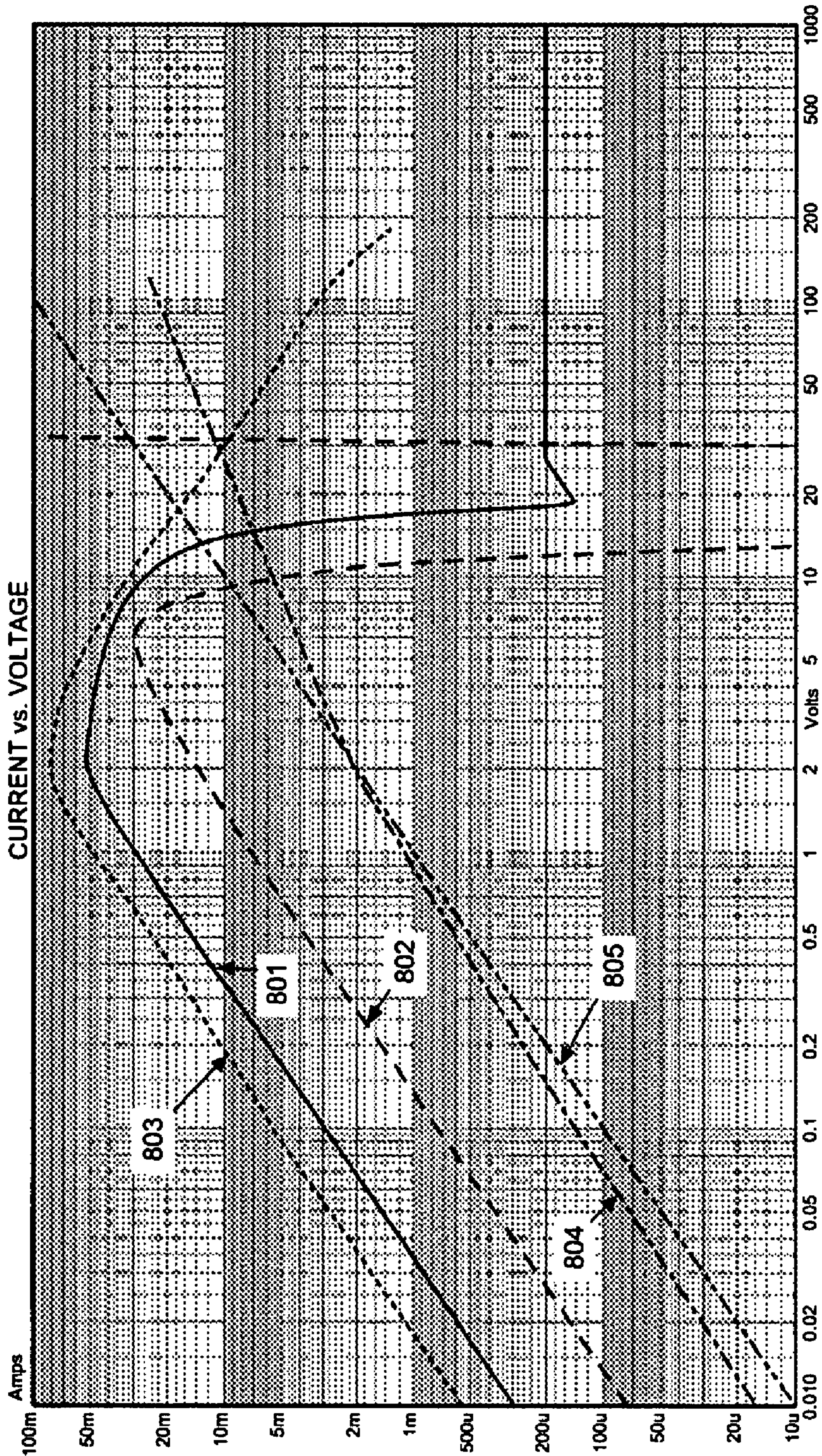
FIG. 8 is a graph illustrating current as a function of voltage across the exemplary current limiter circuit shown in FIG. 3 according to the present invention with respect to typical input characteristics for other conventional current limiting devices.

FIG. 8 is a graph illustrating current as a function of voltage across current limiter circuit 300 with respect to typical input characteristics for other conventional current limiting devices. The current vs. voltage characteristics of current limiter circuit 300 are shown by curve 801. At low voltage, current limiter circuit 300 exhibits a linear resistance of about 33 Ω having a thermal noise of about 0.75 nV/RtHz. For voltages greater than about 25 V, the current is limited to a constant 200 μA. A maximum current of about 50 mA flows at about 2 V. Between about 2 V and about 25 V, current limiter circuit 300 transitions between a constant resistance region and a constant current source region.

The current vs. voltage characteristics for the conventional input protection circuit of U.S. Pat. No. 5,742,463 to Harris are shown by curve 802. The Harris input protection circuit exhibits a breakdown voltage of about 30 V because the entire differential limiter voltage appears on the gates of the transistors. In contrast, current limiter circuit 300 operates easily to the full source-drain breakdown voltage of the transistors, extending to many hundreds of volts. Moreover, the voltage blocking capability of the present invention can be increased into the thousands of volts by cascading transistors.

Other curves representing current vs. voltage characteristics that are shown in FIG. 8 include curve 803 for a PTC thermistor having a resistance of 18 Ω and a thermal noise of 0.55 nV/RtHz; curve 804 for a light bulb having a resistance of 560 Ω and a thermal noise of 3.1 nV/RtHz; and curve 805 for a 1 kΩ resistor having a thermal noise of 4.1 nV/RtHz.

Figure 9:
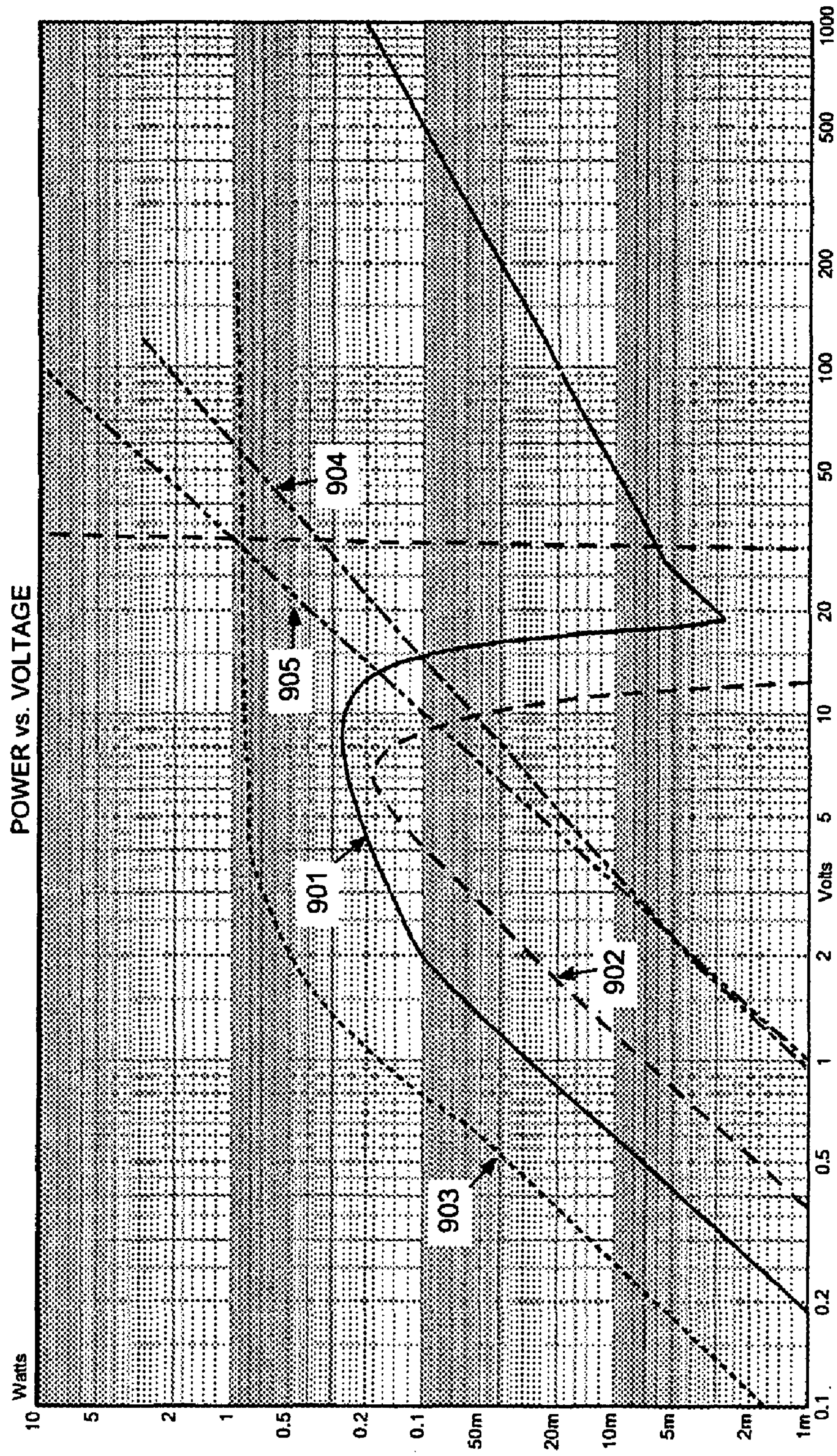
FIG. 9 is a graph illustrating power dissipation as a function of voltage across the exemplary current limiter circuit shown in FIG. 3 according to the present invention with respect to typical input characteristics for other conventional current limiting devices.

FIG. 9 is a graph illustrating power dissipation as a function of voltage across current limiter circuit 300 with respect to typical input characteristics for other conventional current limiting devices. Curve 901 shows that the power dissipation of current limiter circuit 300 is below 250 mW at any input voltage up to about 1000 V. In contrast, the power dissipation the conventional input protection circuit of U.S. Pat. No. 5,742,463 to Harris is shown by curve 902. FIG. 9 also shows other curves representing typical power dissipation as a function of limiter voltage. Curve 903 is the typical power dissipation for a PTC thermistor. Curve 904 is the typical power dissipation for a light bulb having a resistance of 560 Ω. Lastly, curve 905 is the typical power dissipation for a 1 kΩ resistor.

Figure 10:
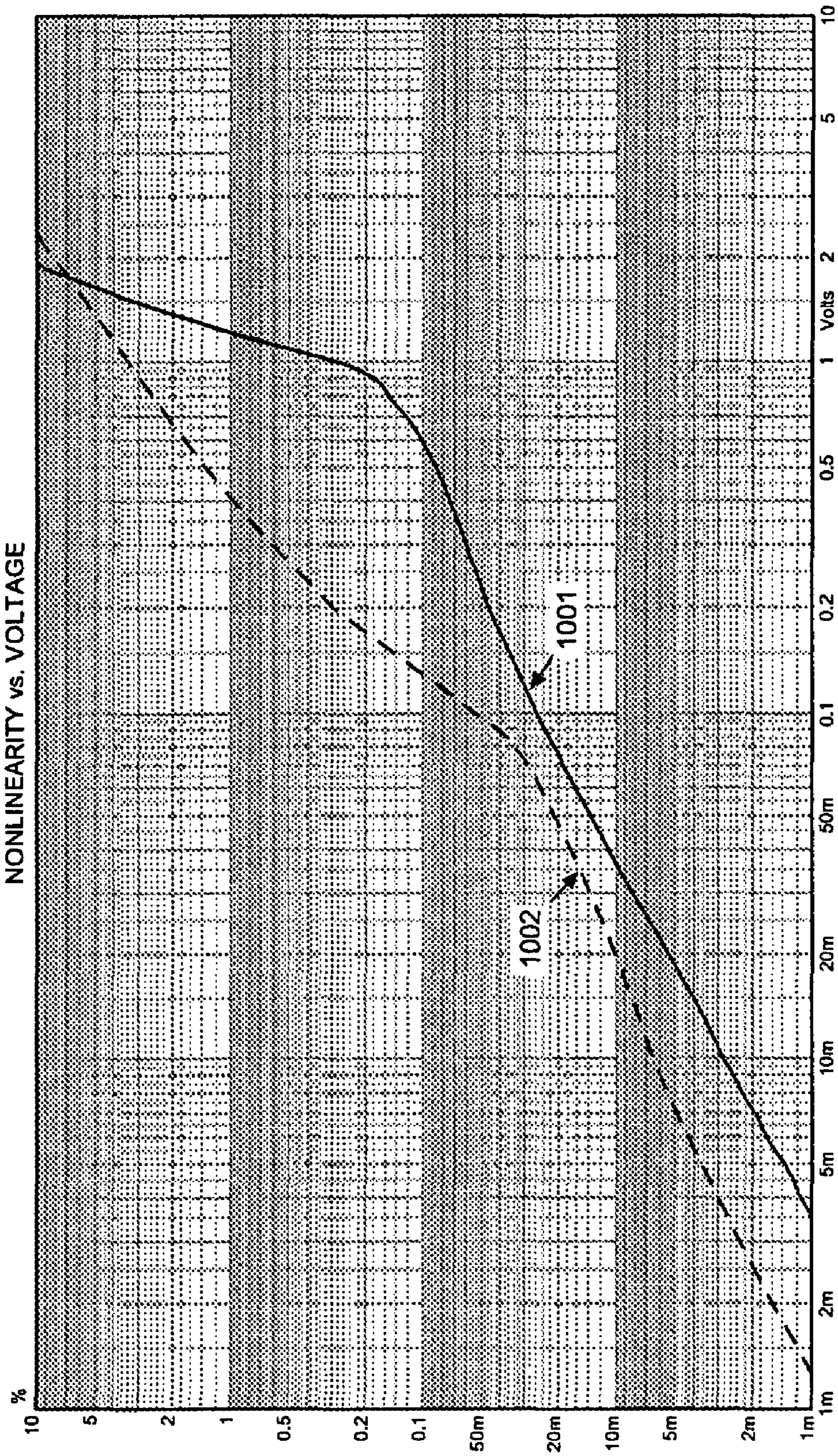
FIG. 10 is a graph illustrating nonlinearity characteristics as a function of voltage across the exemplary current limiter circuit shown in FIG. 3 with respect to a conventional input protection circuit.

FIG. 10 is a graph illustrating nonlinearity characteristics as a function of voltage across current limiter circuit 300 with respect to the conventional input protection circuit of U.S. Pat. No. 5,742,463 to Harris. Curve 1001 shows the nonlinearity characteristics of current limiter circuit 300, and curve 1002 shows the nonlinearity characteristics of the conventional input protection circuit of U.S. Pat. No. 5,742,463 to Harris. Current limiter circuit 300 provides a lower distortion in the normal operating range in comparison to the conventional Harris input protection circuit. At some voltages, the distortion exhibited by current limiter circuit 300 is better than the distortion exhibited by the Harris input protection circuit by an order of magnitude.

Figure 11:
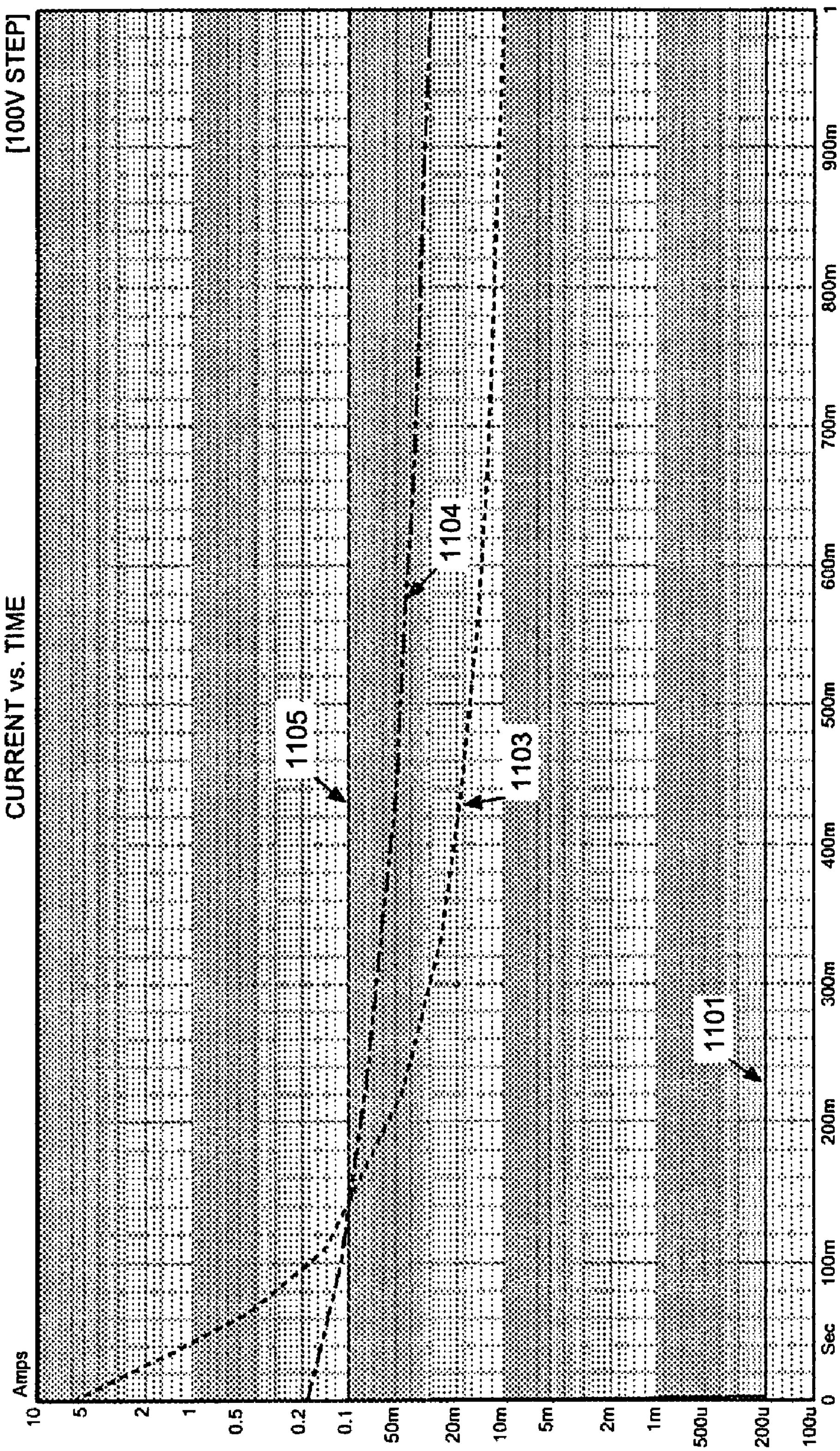
FIG. 11 is a graph illustrating inrush current characteristics as a function of a 100 Volt step across the exemplary current limiter circuit according to the present invention with respect to typical input characteristics for other conventional current limiting devices.

FIG. 11 is a graph illustrating inrush current characteristics as a function of a 100 Volt step across current limiter circuit 300 with respect to typical input characteristics for other conventional current limiting devices. Curve 1101 shows the inrush current characteristics for current limiter circuit 300. Current limiter circuit 300 has about a 50 mA narrow transient (about 100 nS in duration) and then holds a constant current of about 200 μA thereafter. Accordingly, the requirements and stress placed on any clamp diodes coupled to output terminal T2 are significantly reduced. Current limiter circuit 300 has about two orders of magnitude less inrush current than a PTC thermistor, as shown by curve 1103. Curve 1104 shows the inrush current characteristics for a light bulb having a resistance of 560 Ω. Curve 1105 shows the inrush current characteristics for a 1 kΩ resistor.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A current limiter device, comprising:

a signal path coupled between a first terminal and a second terminal, the signal path having a controllable impedance; and a control path coupled between the first terminal and the second terminal, the control path controlling the impedance of the signal path to be a low impedance when a magnitude of a voltage difference between the first and second terminals is less than a first predetermined voltage differential, and controlling the impedance of the signal path to be a high impedance and by generating a substantially constant current when the magnitude of the voltage difference between the first and second terminals is greater than a second predetermined voltage differential, the first predetermined voltage differential being less than the second predetermined voltage differential.

2. The current limiter device according to claim 1, wherein the first predetermined voltage differential between the first terminal and the second terminal is less than about 1 V.

3. The current limiter device according to claim 1, wherein the second predetermined voltage differential between the first terminal and the second terminal is greater than about 10 V.

4. The current limiter device according to claim 1, wherein one of the first and second terminals of the current limiter device is coupled to an input circuit of one of an instrumentation device, a digital multimeter, an oscilloscope, a spectrum analyzer and a general-purpose data-acquisition device.

5. The current limiter device according to claim 1, wherein the signal path has a non-linearity of about less than or equal to 0.3% for about a 1 Volt input signal.

6. A current limiter circuit, comprising:

a signal path between a first terminal and a second terminal, the signal path including at least one depletion-mode device and a variable-impedance device; and a control path coupled between the first terminal and the second terminal, the control path generating a substantially mid-point voltage between the terminals when a magnitude of a voltage difference between the first and second terminals is less than a first predetermined voltage differential, at least one depletion-mode device and the variable-impedance device each having a low impedance in response to the mid-point terminal voltage generated by the control path, the control path further generating a substantially constant current when the magnitude of the voltage difference between the first and second terminals is greater than a second predetermined voltage differential, the first predetermined voltage differential being less than the second predetermined voltage differential, at least one depletion-mode device and the variable-impedance device each having a high impedance in response to the substantially constant current being generated by the control path.

7. The current limiter circuit according to claim 6, wherein each depletion-mode device of the signal path is an N-channel depletion-mode MOSFET transistor.

8. The current limiter circuit according to claim 7, wherein the variable-impedance device is a P-channel JFET transistor.

9. The current limiter circuit according to claim 6, wherein the control path includes at least one depletion-mode device.

10. The current limiter circuit according to claim 9, wherein each depletion-mode device nf the control path is an N-channel depletion-mode MOSFET transistor.

11. The current limiter circuit according to claim 6, wherein the first predetermined voltage differential between the first terminal and the second terminal is less than about 1 V.

12. The current limiter circuit according to claim 6, wherein the second predetermined voltage difference between the first terminal and the second terminal is greater than about to 10 V.

13. The current limiter device according to claim 6, wherein one of the first and second terminals of the current limiter device is coupled to an input circuit of one of an instrumentation device, a digital multimeter, an oscilloscope, a spectrum analyzer and a general-purpose data-acquisition device.

14. The current limiter circuit according to claim 6, wherein the signal path has a non-linearity of about less than or equal to 0.3% for about a 1 Volt input signal.

15. A current limiter device, comprising:

a first terminal;

a second terminal; and a current limiter circuit coupled between the first terminal and the second terminal, the current limiter circuit having a substantially constant-resistance operating mode when a magnitude of a voltage differential between a voltage at the first terminal and a voltage at the second terminal is less than or equal to a first predetermined voltage differential, a substantially constant-current operating mode when a magnitude of the voltage differential between the voltage at the first terminal and the voltage at the second terminal is greater than or equal to a second predetermined voltage differential, and a transition operating mode when the magnitude of the voltage differential between the voltage at the first terminal and the voltage at the second terminal is between the first and second predetermined voltage differentials.

16. The current limiter device according to claim 15, wherein the first predetermined voltage differential between the first terminal and the second terminal is less than about 1 V.

17. The current limiter device according to claim 15, wherein the second predetermined voltage differential between the first terminal and the second terminal is greater than about 10 V.

18. The current limiter device according to claim 15, wherein one of the first and second terminals of the current limiter device is coupled to an input circuit of one of an instrumentation device, a digital multimeter, an oscilloscope, a spectrum analyzer and a general-purpose data-acquisition device.

19. The current limiter device according to claim 15, wherein the current limiter circuit has a non-linearity of about less than or equal to 0.3% for about a 1 Volt input signal when the current limiter circuit is operating in the substantially constant-resistance operating mode.

* * * * *